US007340859B2

(12) United States Patent
Palsrok

(10) Patent No.: US 7,340,859 B2
(45) Date of Patent: Mar. 11, 2008

(54) PLANTER WITH FOLDING LEGS

(76) Inventor: Jeffrey J. Palsrok, 9095 Bluff Lake Dr., Zeeland, MI (US) 49464

( * ) Notice: Subject to any disclaimer, the term of this patent is extended or adjusted under 35 U.S.C. 154(b) by 101 days.

(21) Appl. No.: 11/243,356

(22) Filed: Oct. 4, 2005

(65) Prior Publication Data

US 2006/0070297 A1 Apr. 6, 2006

Related U.S. Application Data

(60) Provisional application No. 60/616,307, filed on Oct. 6, 2004.

(51) Int. Cl.
*A47G 7/00* (2006.01)
(52) U.S. Cl. .................... 47/39; 47/41.14; 47/66.3; 211/181.1; 211/85.23; 211/133.5; 211/132.1; 211/126.6; 248/146; 248/166; 248/167; 248/170
(58) Field of Classification Search .............. 47/83, 47/70, 86, 66.6, 41.01, 39, 41.14, 65.5, 18, 47/66.3, 66.1; 108/25, 26; 206/423; 248/99, 248/97, 146, 128, 153, 166, 167, 170, 175; D11/143, 144, 149; 211/85, 85.18, 85.21, 211/85.23, 12, 14, 88.03, 133.5, 133.6, 132.1, 211/126.6, 181.1
See application file for complete search history.

(56) References Cited

U.S. PATENT DOCUMENTS

| 33,774 A | | 11/1861 | Chamberlain |
| 53,809 A | * | 4/1866 | Gillett ........................ 248/97 |
| 91,362 A | * | 6/1869 | Mahoney ...................... 24/128 |
| 107,073 A | | 9/1870 | McClunie |
| 112,433 A | | 3/1871 | Eastman |
| 353,131 A | | 11/1886 | Greenwood |
| 540,681 A | | 6/1895 | Myers |
| 566,287 A | * | 8/1896 | Gahlau ........................ 362/376 |
| 587,231 A | * | 7/1897 | Parker ........................... 47/47 |
| 754,683 A | | 3/1904 | Neidl |
| 858,543 A | * | 7/1907 | Sickmiller .................. 220/489 |
| 879,613 A | | 2/1908 | Edwards |
| 903,986 A | * | 11/1908 | Klahn ........................... 47/47 |
| 936,619 A | * | 10/1909 | Foy ............................... 47/39 |
| 971,060 A | | 9/1910 | Lynch |

(Continued)

FOREIGN PATENT DOCUMENTS

GB   2212374   7/1989

(Continued)

*Primary Examiner*—Andrea M. Valenti
(74) *Attorney, Agent, or Firm*—Price, Heneveld, Cooper, DeWitt & Litton LLP

(57) ABSTRACT

A planter includes a wire basket having horizontal parallel top rings, bottom rings, and connected vertical wires. Four folding legs each include a top loop rotatably attached to the bottom rings. The legs when in their extended down position each include a short inwardly angled section that nests into the bottom rings for stability. The legs also include an outwardly angled section forming a mid-height detent recess, and a foot. A retainer ring slides downwardly into engagement with all four of the detent recesses to secure the legs in their use positions, which is particularly stable due to the nested relationship with the recesses in the bottom rings. A drip pan, shallow secondary basket and alternative leg-latches are also disclosed.

12 Claims, 7 Drawing Sheets

U.S. PATENT DOCUMENTS

| | | | |
|---|---|---|---|
| 1,522,961 A * | 1/1925 | Macomber | 248/153 |
| 1,641,496 A | 9/1927 | Kuhl | |
| 1,648,570 A | 11/1927 | White | |
| 1,697,789 A * | 1/1929 | Snyder | 248/146 |
| 1,749,497 A | 3/1930 | McGlashan | |
| 1,794,076 A * | 2/1931 | Jablons | 248/167 |
| 1,858,902 A | 5/1932 | Prantl | |
| 2,014,175 A | 9/1935 | Hart | |
| 2,051,596 A | 8/1936 | Harbaugh | |
| 2,683,014 A * | 7/1954 | Sumen et al. | 248/150 |
| 2,702,650 A | 2/1955 | Botknecht | |
| 2,799,972 A | 7/1957 | Teixeira | |
| 2,804,989 A | 9/1957 | Mango | |
| 2,881,939 A | 4/1959 | Nelson | |
| 3,627,242 A * | 12/1971 | Vandermast | 248/97 |
| 3,683,549 A | 8/1972 | Simmon | |
| 3,747,268 A | 7/1973 | Linder | |
| D243,112 S | 1/1977 | Gross | |
| 4,019,280 A | 4/1977 | Summers | |
| 4,022,414 A | 5/1977 | Egger | |
| 4,031,663 A | 6/1977 | Brunk | |
| 4,102,081 A | 7/1978 | Morrow | |
| 4,170,089 A | 10/1979 | Smrt | |
| 4,505,408 A | 3/1985 | Sagol | |
| D278,521 S | 4/1985 | Baird et al. | |
| 4,534,130 A | 8/1985 | Rogers | |
| 4,538,378 A | 9/1985 | Roige | |
| 4,557,200 A | 12/1985 | Geschwender | |
| 4,756,119 A | 7/1988 | Chabot | |
| D297,719 S | 9/1988 | Blaicher | |
| D297,822 S | 9/1988 | Blaicher | |
| 4,788,792 A | 12/1988 | Womick | |
| 4,845,602 A | 7/1989 | Lehocki | |
| 4,899,967 A * | 2/1990 | Johnson | 248/97 |
| 4,914,857 A | 4/1990 | Dodgen | |
| D313,374 S | 1/1991 | Hartley | |
| D322,232 S | 12/1991 | Brinkerhoff | |
| 5,179,799 A | 1/1993 | Hillestad | |
| 5,186,479 A | 2/1993 | Flowers | |
| D352,574 S | 11/1994 | Brown | |
| D353,790 S | 12/1994 | Emalfarb et al. | |
| 5,454,191 A | 10/1995 | Mayeda et al. | |
| 5,454,348 A | 10/1995 | Colwell et al. | |
| 5,460,391 A | 10/1995 | Gantz et al. | |
| 5,481,826 A | 1/1996 | Dickinson et al. | |
| 5,551,715 A | 9/1996 | Pickard | |
| D383,417 S | 9/1997 | Davis | |
| 5,664,367 A | 9/1997 | Huang | |
| D393,816 S | 4/1998 | Conner | |
| D409,520 S | 5/1999 | Conner | |
| 5,960,587 A | 10/1999 | Brasseur, Jr. et al. | |
| D416,214 S | 11/1999 | Conner | |
| 6,027,083 A | 2/2000 | Chang | |
| 6,044,585 A | 4/2000 | Carruth et al. | |
| 6,085,459 A | 7/2000 | Conner | |
| 6,161,333 A | 12/2000 | Poston | |
| 6,269,589 B1 | 8/2001 | Bouler | |
| 6,269,774 B1 | 8/2001 | Stewart | |
| 6,298,600 B1 | 10/2001 | Feldman | |
| 6,314,674 B1 | 11/2001 | Lee | |
| 6,401,387 B1 | 6/2002 | Diloreto et al. | |
| 6,588,620 B1 | 7/2003 | Thuma et al. | |
| 6,594,951 B1 | 7/2003 | Reynolds | |
| D479,633 S | 9/2003 | Weiser et al. | |
| 6,615,543 B1 | 9/2003 | Palsrok | |

FOREIGN PATENT DOCUMENTS

| | | | |
|---|---|---|---|
| JP | 10211072 A | * | 1/1997 |
| JP | 10042700 A | * | 2/1998 |
| JP | 2000139228 A | * | 11/1998 |

* cited by examiner

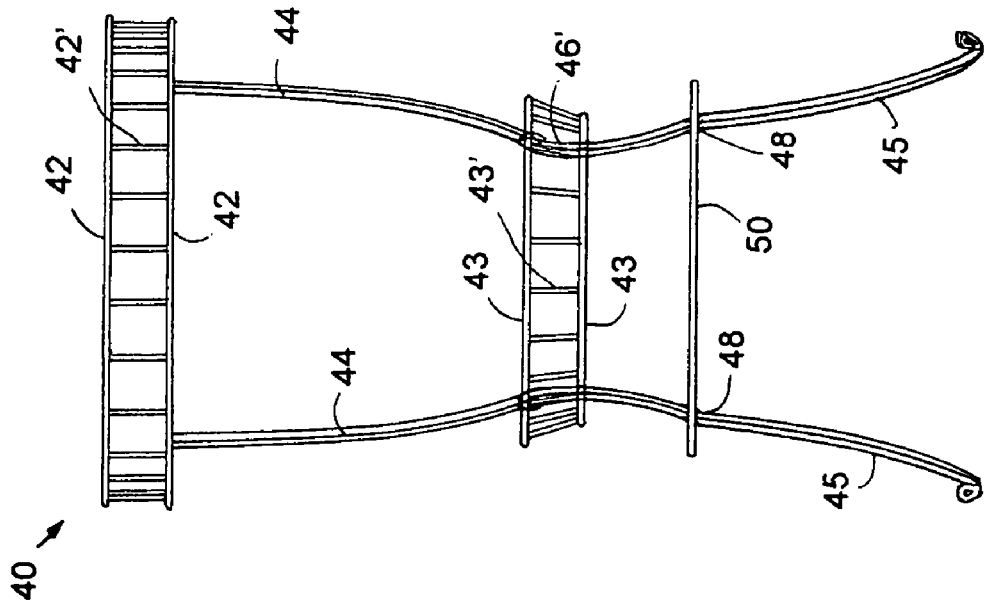
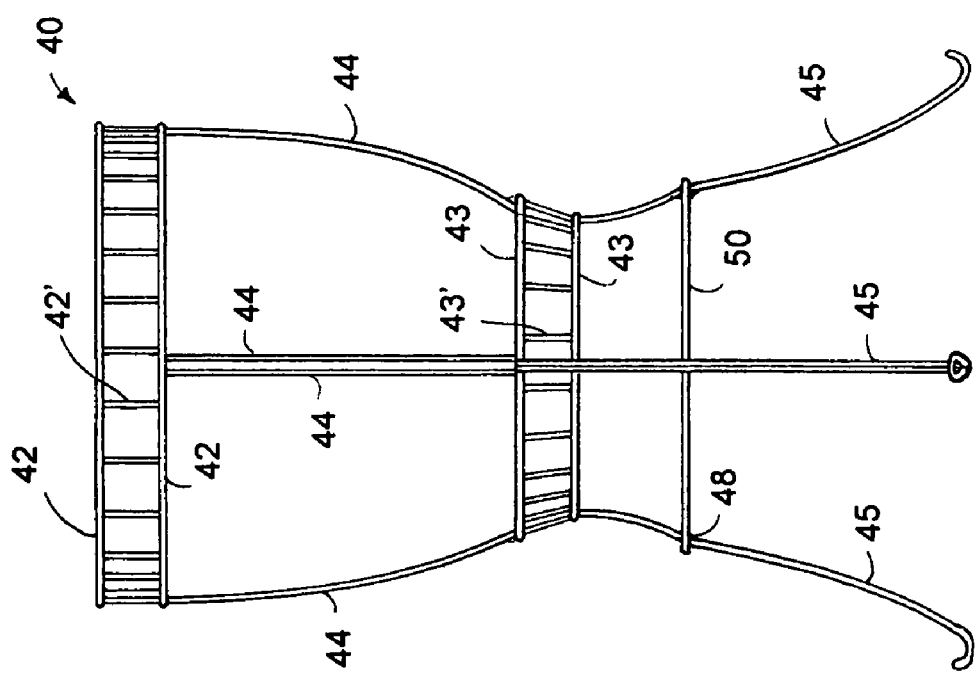

US 7,340,859 B2

PLANTER WITH FOLDING LEGS

This application claims benefit under 35 USC 119(e) of provisional application Ser. No. 60/616,307, filed Oct. 6, 2004, entitled: WIRE PLANTER WITH FOLDING LEGS.

BACKGROUND

The present invention relates to a multi-functional planter with the use of folding legs. The market of selling planters is very competitive. Most planters in the market consist of molded plastic. Others are made from materials such as fiber, porcelain, clay, foam, and metal. All of the materials consist of many different patterns, textures, and designs. These planters are typically made into the same shapes such as pots, bowls and window boxes that are often low to the ground and only have one purpose or use.

Consumers prefer planters that can be flexibly used in different circumstances to create a desired aesthetic appearance. For example, a multi-purpose planter that can be raised and supported on legs, or transformed to be used as a hanging basket on a deck, patio, porch, etc. provides more options for the consumer. Furthermore, consumers wanting the ability to use the planter outside as well as inside is another advantage.

Another important aspect is that consumers want planters that are easily transformed from the initial configuration (shipping/hanging basket position) to the raised configuration (plant stand position . . . when legs are folded down). In a retail setting it is very important that the consumer can easily and quickly understand how to transform the planters. It is also important that this is done without requiring assembly and without accessory parts such as bolts, nuts, washers, etc.

One of the most important cost factors in this industry is transportation. It is critical that the planters can be tightly packed and condensed for transport as they may be imported from other countries. This is also important as it pertains to distribution. The planters may be directly shipped to horticultural growers so they can grow plants/flowers in the planters, then ship the product to retailers on tightly configured shipping racks. The planters may also be shipped to a distribution facility, packaged in a box, stored in a warehouse, then shipped to retailers or even directly to consumers through UPS or Fed Ex. It is desirable to provide a planter that minimizes all of these associated costs Another aspect concerns removable inserts for holding plants/flowers in planters. If the plants/flowers deteriorate and become poor in quality, the retailer wants the ability to dispose of the plants/flowers in the insert without discarding the planter itself. Further, retailers want to offer inserts tailored for each season to be used so that customers come back each season to purchase different inserts from the retailer after they have purchased the original planter.

Thus, a system having the aforementioned advantages and solving the aforementioned issues is desired.

SUMMARY OF THE PRESENT INVENTION

In one aspect of the present invention, a planter is provided that is adapted to support a plant. The planter includes a basket having a top ring, a bottom ring, and vertically-extending members connecting the top and bottom rings. The planter further includes at least three folding legs movable between a raised stored position and a lowered basket-supporting use position, each leg including an upper end pivotally connected to the bottom ring, a lower end forming a foot, and an intermediate section having a detent formed thereon. A retainer ring surrounds the legs and, when the legs are in the use position, is shaped to drop down into engagement with the detents on each of the legs to secure the legs in the use position.

In another aspect of the present invention, a planter adapted to support plants includes a basket-shaped member adapted to hold plants, the basket-shaped member having a top and a bottom and including pairs of vertically-extending members extending between the top and bottom. The planter also includes at least three folding legs movable between a raised stored position and a lowered basket-supporting use position, each leg being pivotally connected to the basket-shaped member near one of the vertically-extending members and having a detent formed thereon that is shaped to fit into a space between an associated one pair of the vertically-extending members to frictionally engage the vertically-extending members and hold the legs in the raised stored position.

In still another aspect of the present invention, a planter adapted to support a plant includes a basket having a top, a bottom, and vertically-extending members connecting the top and bottom, and further includes at least three folding legs movable between a raised stored position and a lowered basket-supporting use position, each leg including an upper end pivotally connected to the bottom ring, a lower end forming a foot, and an intermediate section having a detent formed thereon. A retainer ring surrounds the legs and, when the legs are in the raised stored position, is shaped to fit between the vertically-extending members and the legs with the detents engaging the vertically-extending members.

These and other aspects, objects, and features of the present invention will be understood and appreciated by those skilled in the art upon studying the following specification, claims, and appended drawings.

BRIEF DESCRIPTION OF DRAWINGS

FIGS. 1-5 are perspective, side, rotated side, top, and bottom views of a planter embodying the present invention, each showing the legs extended for use;

DETAILED DESCRIPTION OF PREFERRED EMBODIMENTS

Figure 1:
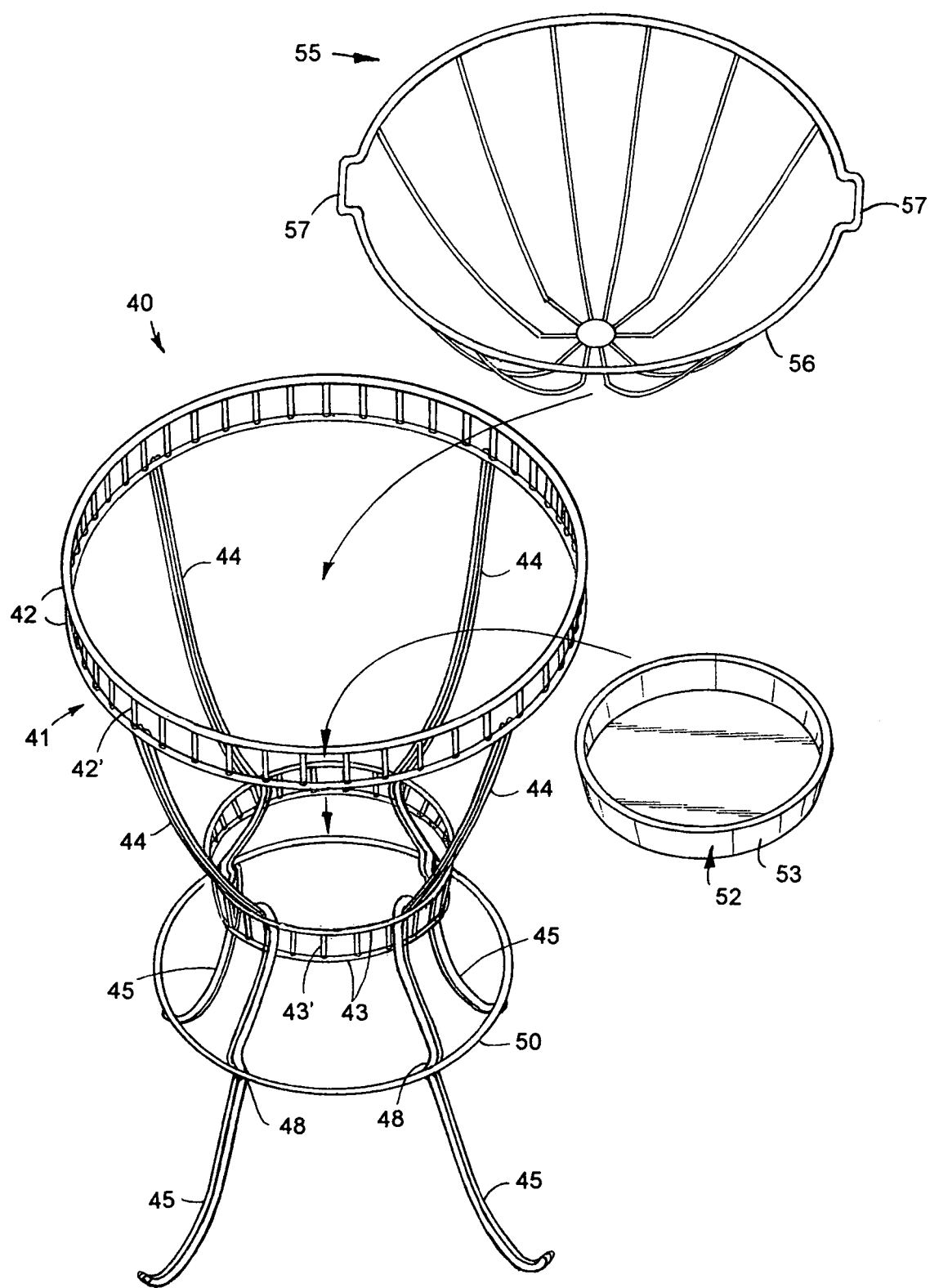
Figure 4:
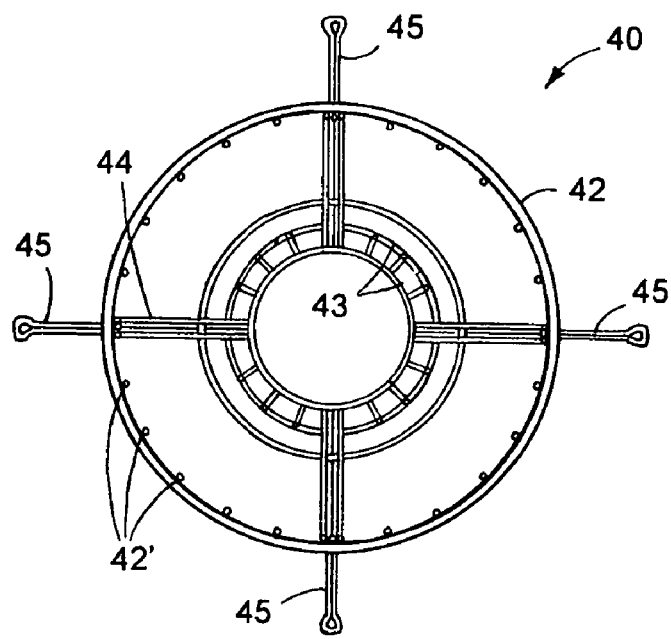
Figure 5:
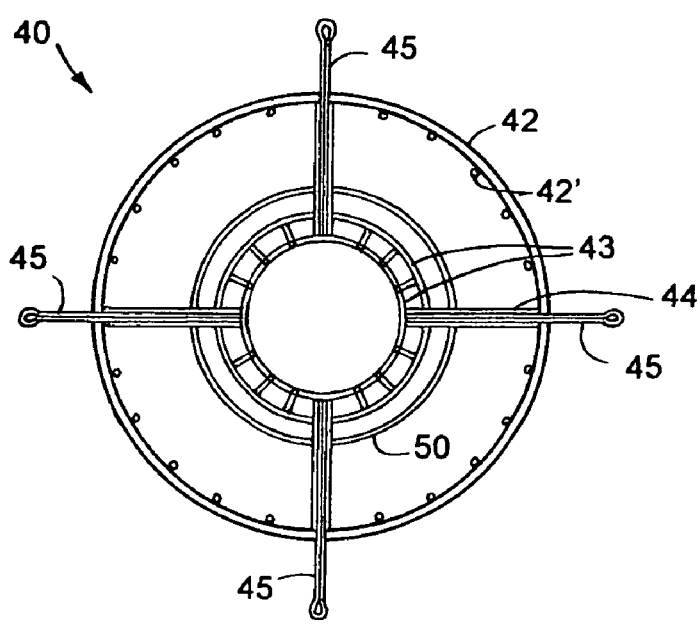
Figure 6:
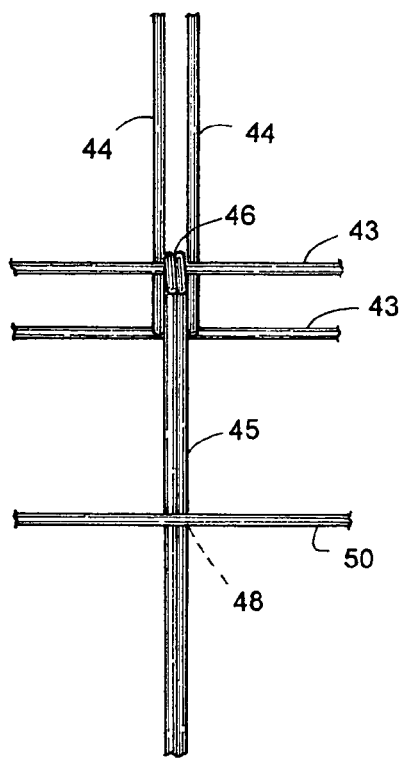
FIGS. 6 and 7 are enlarged fragmentary side profile and side face views of one of the extended legs shown in FIG. 3.
Figure 7:
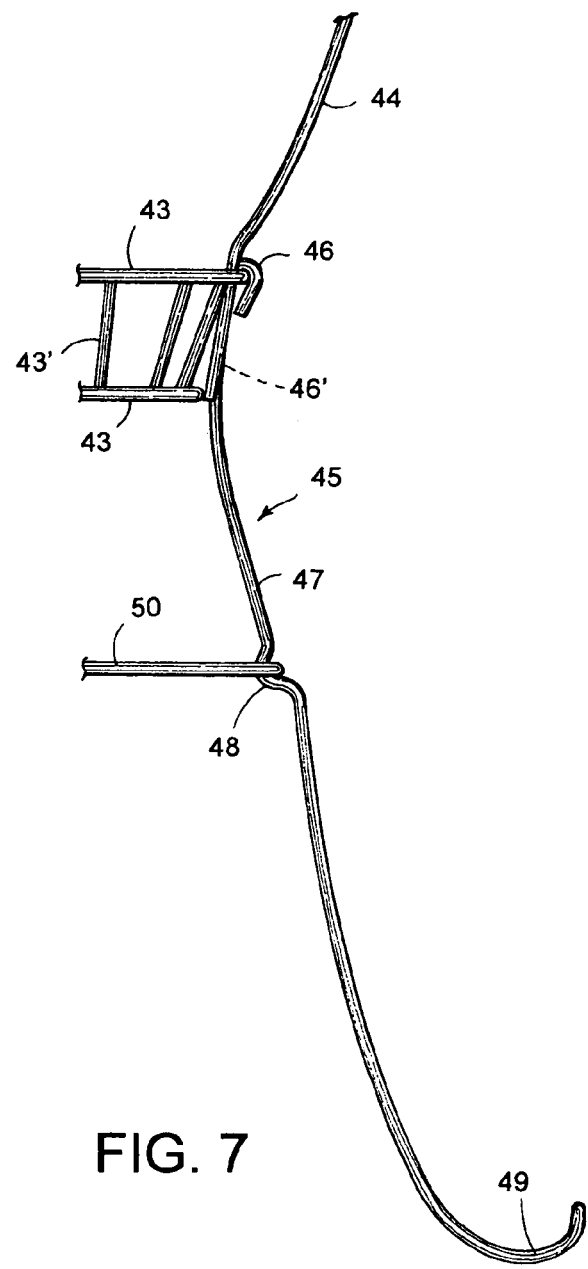
Figure 8:
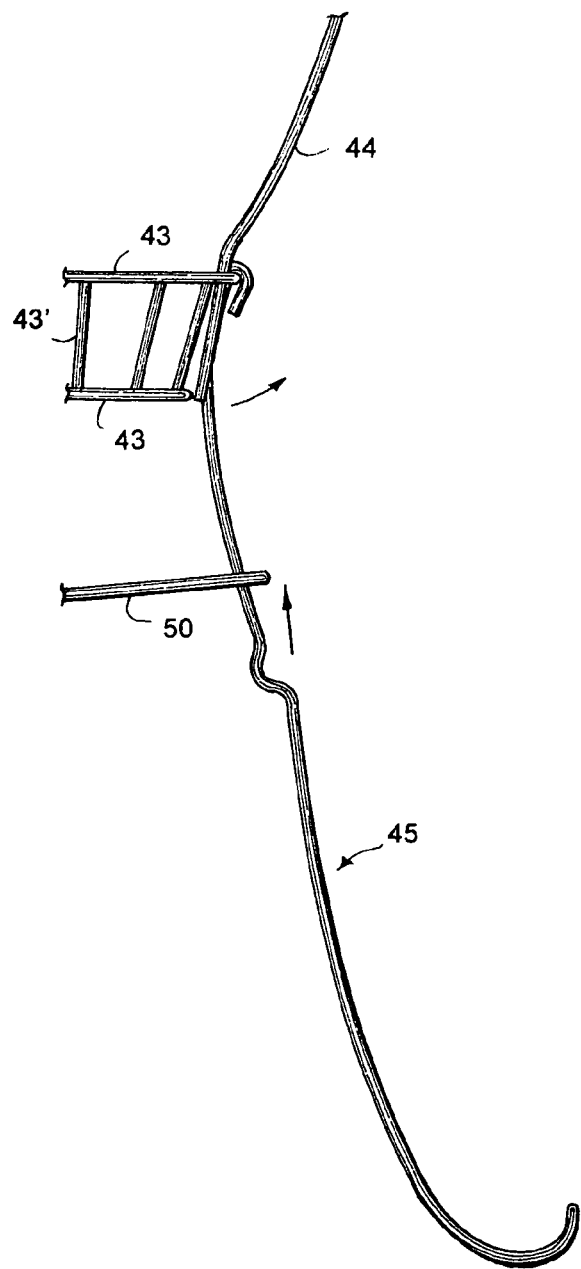
FIG. 8 is a view similar to FIG. 6, but with the retainer ring released such that the legs can be rotated upwardly.
Figure 10:
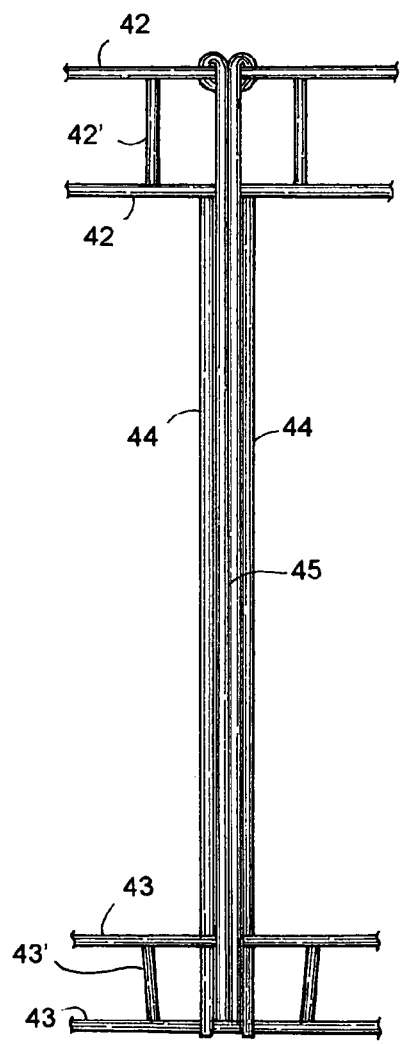
FIGS. 9-10 are views similar to FIGS. 6-7, but with the leg in the raised/stored position.
Figure 9:
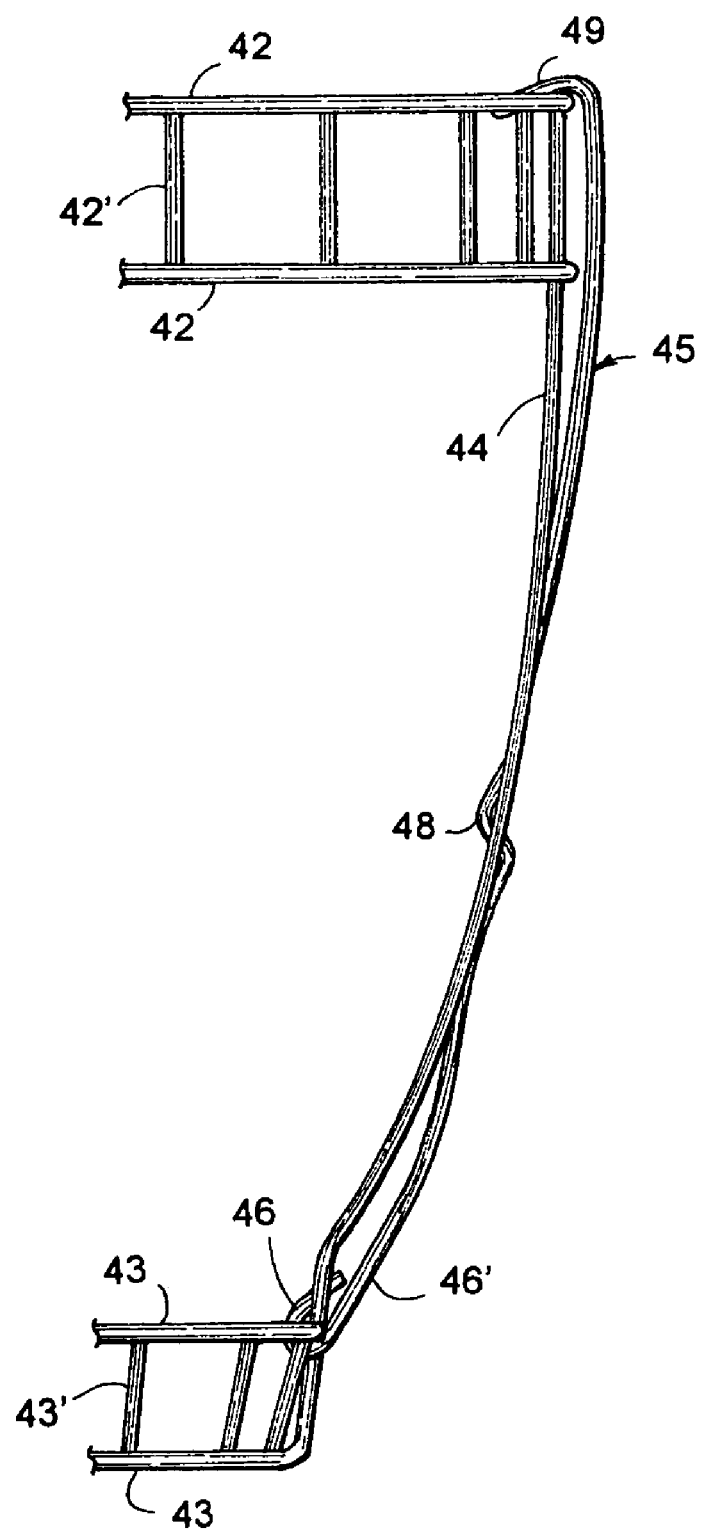
Figure 12:
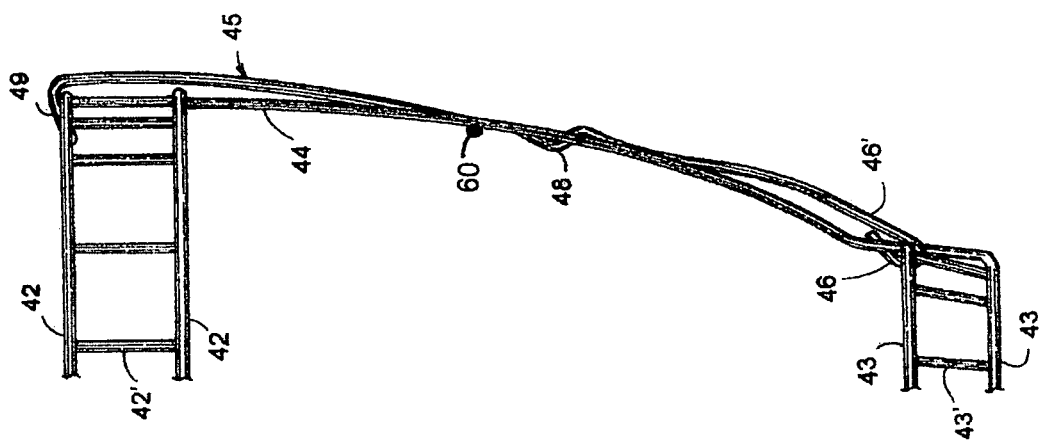
FIGS. 11-12 are views similar to FIGS. 2 and 9, but of a modified leg detent structure.
Figure 11:
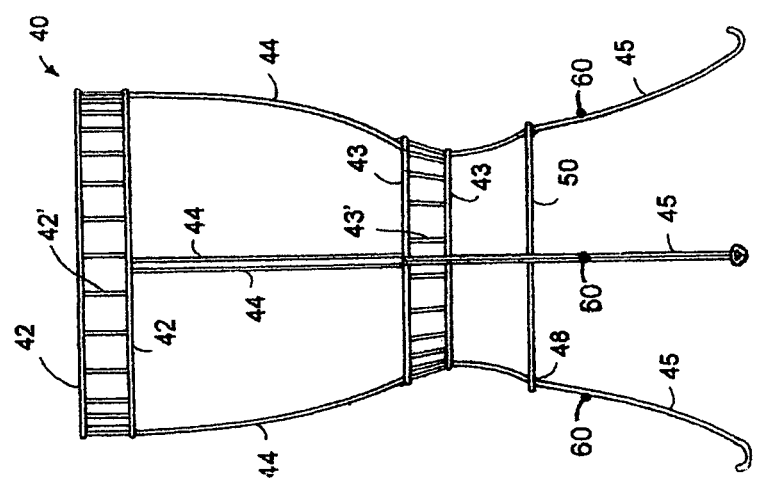

The wire planter 40 (FIG. 1) (also called a "plant stand" herein) includes a wire basket 41 having horizontal parallel top rings 42 connected by short wire segments 42', parallel upper and lower bottom rings 43 connected by short wire segments 43', and vertical parallel arcuate connecting wires 44. A plastic pot holder or mesh plant holder can be placed within the wire basket 41. Four folding legs 45 are formed from parallel wire segments. The legs 45 each include a top loop 46 (FIG. 6) rotatably attached to the top one of the bottom rings 43. The legs 45 (when positioned in their extended down position) further each include a short inwardly angled section 46', an outwardly angled section 47 with inwardly bent section forming a mid-height detent recess 48, and a foot 49. A retainer ring 50 slides downwardly into engagement with all four of the detent recesses 48 (FIGS. 1-3). This biases the short inwardly angled section 46' (FIG. 6) into a nested position in a mating space created between the parallel bottom rings 43 and between a lower one-inch section of the parallel arcuate connecting wires 44. The nested mating arrangement supporting the inwardly angled section When the retainer ring 50 is snapped out of the detent recesses 48 (FIG. 8), the legs 45 can be rotated upwardly against sides of the basket 41, in positions generally close to the parallel arcuate connecting wires 44 of the basket 41 (FIG. 9). The feet 49 are bent sections forming a slightly hooked shape, such that in this raised position, the feet 49 snap over the top ring 42. Also, the middle section of the legs 45 in the area of the detent recesses 48 are formed inwardly to fit between adjacent ones of the parallel arcuate connecting wires 44. The arcuate connecting wires 44 are located close enough together to receive the legs 45 and hold them in a stable position. If desired, the connecting wires 44 can frictionally engage the legs 45 at recesses 48, but this is not required when the feet 49 are designed to provide sufficient retention force to hold the legs in the raised position. In an alternative embodiment, the legs 45 are modified to include a detent 60 in the form of a ball-headed protrusion facing outwardly on the legs when in the lowered position. When the legs are raised, the detent 60 is shaped to frictionally snap-fit between the wires 44, thus holding the legs in the raised storage position.

In the leg-folded position, the planter 40 is particularly desirable because it can be nested with other planters 40 for dense storage and shipment, and for display. This is very important because shipping costs are a large part of the planter business. Specifically, the planters 40 can be nested together, with each successive planter 40 taking up only an additional couple inches of vertical height to the stack of planters. Further, the total height of the planter 40 when in the folded position is only about twelve inches high, which is desirable since it fits into existing shelf space in the horticulture industry. Still further, the legs 45 of the planter 40 can be folded while the planter 40 is holding a plant, without damaging the plant.

It is contemplated that a water-receiving drip pan 52 (FIG. 1) can be positioned within the bottom rings 43. The drip pan 52 is circular in shape, and sides 53 of the drip pan 52 are angled to match a shape of the two bottom rings 43. This allows the pan 52 to nestingly drop into a stable position within a bottom of the basket 41. If desired, one or more linear wires can be extended across the bottom of the basket 41 between the bottom rings 43 to support the drip pan 52.

Optionally, an internal shallow basket 55 (FIG. 1) can be provided for dropping into the basket 41. The illustrated internal shallow basket 55 includes a wire matrix that is shaped similar to the internal dimensions of the basket 41, but with the basket 55 being shallower. Also, the outer ring 56 on the basket 55 includes two hook-shaped outwardly-extending loops 57 that form handles and that also engage the top ring 42 to support and secure the shallow basket 55 at an appropriate height within the basket 41.

It is contemplated that the legs 45 could be retained by an alternative latching arrangement. For example, the alternate latching arrangement could be a laterally extending strap or bent-wire releasable clasp that extends across the leg to retain the leg section 46' in the recess between bottom rings 43.

It is contemplated that plastic inserts will be made that fit matably into the top of the plant stand 40. The inserts will preferably be made of thin plastic material. If the plants/flowers deteriorate and become poor in quality, the retailer will have the ability to dispose of the plants/flowers in the insert without discarding the planter itself. The retailer will be able to offer inserts with different plants/flowers for each season to be used in the planter. This will also encourage customers to come back each season to purchase different inserts from the retailer after they have purchased the planter.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A planter adapted to support a plant, comprising:
   a basket including at least one top ring, upper and lower bottom rings, and vertically-extending members connecting the top and bottom rings;
   at least three folding legs movable between a raised stored position and a lowered basket-supporting use position, each leg including an upper end pivotally connected to the upper bottom ring, a lower end forming a foot, and an intermediate section having a detent formed thereon; the legs, when in the use position, abutting an outer surface of the lower bottom ring, each leg having a short inward angled section starting near the bottom rings and transitioning into an outward angled section near the detent; and
   a retainer ring surrounding the legs that, when the legs are in the use position, is shaped to drop down into engagement with an outer surface of the detents on each of the legs below the lower bottom ring to secure the legs in the use position.

2. The planter defined in claim 1, wherein the bottom ring forms a plurality of recesses for matingly receiving an associated portion of each one of the legs when the legs are in the use position, which recesses stabilize the legs.

3. The planter defined in claim 1, wherein the legs define a cavity around the basket for storing the retainer ring when the legs are in the raised stored position.

4. The planter defined in claim 1, including a drip pan shaped to fit into a space defined by the bottom rings.

5. The planter defined in claim 1, including a shallow basket shaped to fit into a space defined by the top rings.

6. The planter defined in claim 1, wherein the at least three folding legs include at least four folding legs.

7. The planter defined in claim 1, wherein, when the legs are in the raised stored position, the retainer ring is shaped to fit inside the legs and outside the vertically extending members.

8. The planter defined in claim 1, wherein the basket, folding legs and retainer ring are all made from bent wire.

9. The planter defined in claim 1, wherein the vertically extending members each occur in parallel pairs that define a spaced therebetween, and the legs each include a detent member shaped to frictionally fit into the space and retain the legs in the raised stored position.

10. The planter defined in claim 1, wherein the vertically extending members comprise wire segments bent to an aesthetic shape.

11. The planter defined in claim 10, wherein the legs are each made from wire and are each shaped to generally mimic and match the aesthetic shape of the vertically extending members when the legs are in the raised stored position.

12. A planter adapted to support a plant, comprising:

a basket including at least one top ring, at least one bottom ring, and several pairs of vertically-extending members connecting the top and bottom rings each pair defining an elongated leg-nesting space therebetween;

at least three folding legs movable between a raised stored position where each leg nests closely into an associated one of the leg-nesting spaces and a lowered basket-supporting use position, each leg including an upper end pivotally connected to the bottom ring, a lower end forming a foot, and an intermediate section having a detent formed thereon, each leg having a short inward angled section starting near the bottom ring and transitioning into an outward angled section near the detent; and a retainer ring surrounding the legs and engaging an outer surface of the detent when the legs are in the use position, but when the legs are in the raised stored position, the detent is shaped to closely fit between the vertically-extending members, the foot on each leg being shaped to frictionally engage the top ring to hold the legs in the raised stored position.

\* \* \* \* \*